United States Patent Office 3,803,189
Patented Apr. 9, 1974

3,803,189
METAL TETRACHLOROCROTONATE COMPOUNDS AND METHODS OF PREPARATION THEREOF
Frank R. Haglid, 1 Crestfield Road, Crestfield, Wilmington, Del. 19810
No Drawing. Filed Jan. 25, 1971, Ser. No. 109,585
Int. Cl. C07f 13/00, 15/00; C07c 57/08
U.S. Cl. 260—429 R        11 Claims

ABSTRACT OF THE DISCLOSURE

Cis-2,3,4,4-tetrachlorocrotonic acid is reacted with a selected metal compound to form the corresponding metal tetrachlorocrotonate. Also a metal tetrachlorocrotonate may be reacted with a second metal compound to form a second metal tetrachlorocrotonate compound.

SUMMARY OF THE INVENTION

This invention relates to novel compounds which are useful as plant bactericides, herbicides, flame retardants, and for the extraction of metal ions. The compounds of this invention are represented by the formula:

(1) 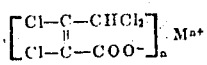

where
$n$ is a whole number selected from the group consisting of 1, 2, and 3; and
$M$ is a cation of an element selected from the group consisting of Li, Na, K, Rb, Cs, Fr, Be, Mg, Ca, Sr, Ba, Ra, Sc, Y, La, Ac, Ti, Zr, Hf, V, Nb, Ta, Cr, Mo, W, Mn, Tc, Re, Fe, Ni, Co, Ru, Rh, Pd, Os, Ir, Pt, Cu, Ag, Au, Zn, Cd, Hg, Al, Ga, In, Tl, Ge, Sn, Pb, Sb, Bi, Po, Ce, Pr, Nd, Pm, Sm, Eu, Gd, Tb, Dy, Ho, Er, Tm, Yb, Lu, Th, Pa, U, Np, Am, Cm, Bk, Cf, Es, Fm, Md, and Lw.

The elements M listed above represent all the elements tabulated in the Periodic Table with the exclusion of those elements having atomic numbers 1, 2, 5-10, 14-18, 33-36, 52-54, 85 and 86 as identified, for example, in Lange's Handbook of Chemistry, 8th ed., pp. 56-57. For the purposes of this disclosure, the above elements are defined to be metals.

This invention further relates to a process of preparing the compounds of Formula 1 wherein cis-2,3,4,4-tetrachlorocrotonic acid, hereinafter referred to as tetrachlorocrotonic acid, is treated with a compound of the formula $MR_n$ where M and n are defined as above, and R is oxygen, hydroxide, alkoxide or an anion of a weak acid with a pKa of 1.9 or greater. Use of anions of stronger acids usually reduces the yield.

DESCRIPTION OF THE INVENTION

This invention relates to the discovery of the compounds of Formula 1 which are useful as plant bactericides, herbicides, flame retardants, and for the extraction of metal ions.

The preparation of tetrachlorocrotonic acid has been previously disclosed by G. Maahs [Ann. 686 (1965) 55]. The compounds of this invention are formed by reacting a metal-containing compound with an equivalent amount of tetrachlorocrotonic acid in water and/or an organic solvent. In some instances when water is employed as the solvent phase, the tetrachlorocrotonic acid compound which is formed does not separate, in which case it is then isolated from the reaction mixture by extraction with a water immiscible organic solvent. The reaction is represented by the following equation:

(2) 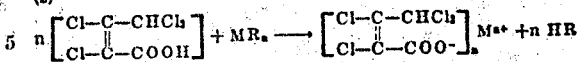

where n, M and R are as defined above.

It will be understood by those skilled in the art that actual stoichiometry of both the reaction equation and the reactants $MR_n$ and products HR will depend on the particular cations and anions involved in the reaction.

Illustrative of this reaction is the synthesis of calcium tetrachlorocrotonate:

(3) 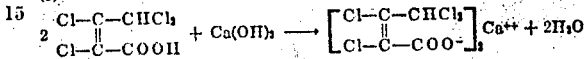

It will also be understood that the metal compounds of tetrachlorocrotonic acid can also be formed from another metal compound of tetrachlorocrotonic acid, preferably from the alkali metal compounds (sodium, potassium or lithium), by mixing equivalent amounts of the metal tetrachlorocrotonate starting material with a starting material containing the desired cation M in the presence of a solvent. If water is used as the solvent phase and the metal tetrachlorocrotonate product does not separate, it is isolated by extraction with a water immiscible organic solvent. This reaction is represented by the following equation:

(4) 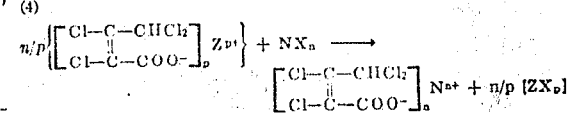

where
$n$ and $p$ are whole numbers selected from the group consisting of 1, 2 and 3;
N and Z are cations of elements selected from the group consisting of Li, Na, K, Rb, Cs, Fr, Be, Mg, Ca, Sr, Ba, Ra, Sc, Y, La, Ac, Ti, Zr, Hf, V, Nb, Ta, Cr, Mo, W, Mn, Tc, Re, Fe, Ni, Co, Ru, Rh, Pd, Os, Ir, Pt, Cu, Ag, Au, Zn, Cd, Hg, Al, Ga, In, Tl, Ge, Sn, Pb, Sb, Bi, Po, Ce, Pr, Nd, Pm, Sm, Eu, Gd, Tb, Dy, Ho, Er, Tm, Yb, Lu, Th, Pa, U, Np, Pu, Am, Cm, Bk, Cf, Es, Fm, Md, and Lw, with the proviso that N and Z are different; and
X is an anion of a weak or strong acid.

It will be understood by those skilled in the art that the actual stoichiometry of the reaction equation and the reactants, $NX_n$, and products $ZX_p$, will depend on the particular cations and anions involved in the reaction.

Illustrative of this reaction is the synthesis of nickel tetrachlorocrotonate from sodium tetrachlorocrotonate:

(5) 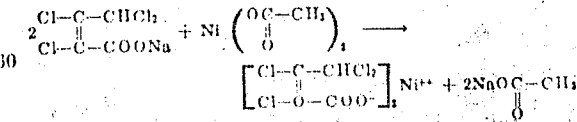

It is a feature of this invention that differences in the partitioning of individual metal tetrachlorocrotonates between organic and aqueous phases can be used to advantage to force the reaction toward formation of the new tetrachlorocrotonate as well as to separate the desired product from by-products and/or unreacted materials.

The temperature employed in carrying out the process of this invention can be as low as the freezing point of the solvent system. However, a reaction temperature of from 10 to 42° C. will normally be used. Higher temperatures can of course be used, but such temperatures result in excessive decomposition of the metal compounds.

The solvents used in the process of this invention include inert liquids under the conditions employed. Representative of the suitable solvents are organic liquids which are more polar than benzene such as diethyl ether, chloroform, chlorobenzene, ethylenechloride, acetone, ethanol, methanol, nitrobenzene, acetonitrile, nitromethane, and N,N-dimethylformamide. Water can also be used as a solvent as can mixtures of two or more of the above solvents with the proviso that when one of the solvents is water, the organic phase will ordinarily be a water immiscible liquid. The preferred solvents are water, diethyl ether and chloroform.

The solvents can be used in concentrations as low as 0.5 parts of solvent per part of tetrachlorocrotonic acid introduced into the process. However, amounts of solvent from about 100 to 500% of the weight of tetrachlorocrotonic acid will normally be used. Greater amounts of solvent can of course be used, even as high as 1000% to 5000% based on the tetrachlorocrotonic acid, but such amounts merely dilute the components in the reaction mass with no particular advantages obtained.

Well defined crystalline metal compounds of tetrachlorocrotonic acid with melting points in the range of 100 to 200° C. are obtained by evaporation of the solvent from essentially anhydrous organic phases containing the compounds or by addition of a second solvent of low polarity such as hexane to the organic phase, which causes precipitation of the metal compounds.

In general, the stability of the compounds of this invention is good. As solids, they are highly stable below their melting points and they can be stored for prolonged periods as solutions in organic solvents. In aqueous solutions and especially under alkaline conditions, the stability is shortened. Sodium tetrachlorocrotonate in dilute aqueous solution at pH 10 for instance, has a half-life of 2 to 3 weeks at room temperature.

The following examples are presented to further illustrate this invention. In the examples parts and percentages are by weight unless otherwise specified.

Example 1

Ten parts tetrachlorocrotonic acid is neutralized with 1.8 parts sodium hydroxide in 30 parts of water at 15° C. The resulting solution is evaporated to dryness in vacuum at 80° C. The residue is dissolved in 30 parts diethyl ether. The resulting solution is diluted with 100 parts n-hexane and the precipitated sodium tetrachlorocrotonate, M.P. 145–149° C., is isolated by filtration.

Example 2

By substituting 1.7 parts calcium hydroxide for the sodium hydroxide used in Example 1, calcium tetrachlorocrotonate is obtained. M.P. 148–151° C.

Example 3

Ten parts tetrachlorocrotonic acid is mixed with 4.5 parts cupric acetate monohydrate and 50 parts diethyl ether. The mixture is agitated for 15 minutes at room temperature. The resulting solution is evaporated to dryness. The residue is dissolved in 20 parts diethyl ether. The resulting solution is diluted with 100 parts n-hexane and the precipitated cupric tetrachlorocrotonate, M.P. 160–165° C., is isolated by filtration.

Example 4

Ten parts tetrachlorocrotonic acid is mixed with 5.5 parts manganous acetate tetrahydrate and 50 parts chloroform. The mixture is agitated for 15 minutes. The resulting solution is evaporated to dryness and the residue is dissolved in 20 parts chloroform. The resulting solution is diluted with 100 parts n-hexane and the precipitated manganous tetrachlorocrotonate, M.P. 159–162° C., is isolated by filtration.

Example 5

Ten parts tetrachlorocrotonic acid is mixed with 4.5 parts zinc acetate dihydrate and 50 parts diethyl ether. The mixture is agitated for 15 minutes and is then evaporated to dryness. The residue is dissolved in 20 parts diethyl ether and the resulting solution is diluted with 100 parts n-hexane and the precipitated zinc tetrachlorocrotonate, M.P. 131–137° C., is isolated by filtration.

Example 6

Ten parts tetrachlorocrotonic acid is neutralized with 1.8 parts sodium hydroxide in 35 parts of water at 15° C. To the resulting solution is added 125 parts diethyl ether and 4.2 parts ferric sulfate nonahydrate with stirring at room temperature. After about 30 minutes, the ethereal layer is separated and washed with 50 parts of a saturated aqueous sodium chloride solution. The ethereal layer is separated, dried over anhydrous sodium sulfate and evaporated to dryness. The residue is dissolved in 20 parts of benzene. The resulting solution is diluted with 100 parts of n-hexane and the precipitated ferric tetrachlorocrotonate, M.P. 89–14° C., is isolated by filtration.

Example 7

Ten parts tetrachlorocrotonic acid is neutralized with 1.8 parts sodium hydroxide in 35 parts of water at 15° C. To the resulting solution is added 125 parts diethyl ether and 4.5 parts aluminum sulfate $[Al_2(SO_4)_3 \cdot 18H_2O]$ with stirring. After about 30 minutes the ethereal layer is separated and washed with 50 parts of a saturated aqueous sodium chloride solution. The ethereal layer is separated, dried over anhydrous sodium sulfate, and evaporated to dryness. The residue is dissolved in 20 parts of benzene followed by dilution with 100 parts of n-hexane to precipitate aluminum tetrachlorocrotonate, M.P. 300° C. with decomposition, which can be isolated by filtration.

Example 8

Ten parts tetrachlorocrotonic acid is neutralized with 1.8 parts sodium hydroxide in 35 parts of water at 15° C. To the resulting solution is added 125 parts diethyl ether and 4.5 parts chromic sulfate $[Cr_2(SO_4)_3 \cdot 15H_2O]$ with stirring. After about 30 minutes, the ethereal layer is separated and washed with 50 parts of a saturated aqueous sodium chloride solution. The ethereal layer is separated, dried over anhydrous sodium sulfate, and evaporated to dryness. The residue is dissolved in 20 parts of benzene followed by the addition of 100 parts of n-hexane to precipitate chromium tetrachlorocrotonate, M.P. 70–75° C., which can be isolated by filtration.

Example 9

Ten parts tetrachlorocrotonic acid is neutralized with 1.8 parts sodium hydroxide in 35 parts of water at 15° C. To the resulting solution is added 125 parts diethyl ether and 5.6 parts nickelous acetate tetrahydrate with stirring. After about 30 minutes, the etheral layer is separated and washed with 50 parts of a saturated aqueous sodium chloride solution. The ethereal layer is separated, dried over anhydrous sodium sulfate, and evaporated to dryness. The residue is dissolved in 20 parts of benzene, and is then diluted with 100 parts of n-hexane to precipitate nickelous tetrachlorocrotonate, M.P. 148–152° C., which can be isolated by filtration.

Example 10

By substituting molecular equivalent amounts of the metal compounds shown below for the sodium hydroxide in Example 1, the corresponding metal tetrachlorocrotonate is obtained.

| Metal compound: | Metal tetrachlorocrotonate |
|---|---|
| Potassium methoxide | Potassium tetrachlorocrotonate. |
| Lithium carbonate | Lithium tetrachlorocrotonate. |
| Magnesium hydroxide | Magnesium tetrachlorocrotonate |
| Strontium oxide | Strontium tetrachlorocrotonate. |
| Barium hydroxide | Barium tetrachlorocrotonate. |

Example 11

By substituting molecular equivalent amounts of the metal compounds shown below for the cupric acetate in Example 3, the corresponding metal tetrachlorocrotonate is obtained.

| Metal compound: | Metal tetrachlorocrotonate |
|---|---|
| Silver acetate | Silver tetrachlorocrotonate. |
| Cadmium acetate | Cadmium tetrachlorocrotonate. |
| Cobalt acetate | Cobalt tetrachlorocrotonate. |
| Cerium acetate | Cerium tetrachlorocrotonate. |
| Uranyl acetate | Uranyl tetrachlorocrotonate. |

Example 12

By substituting molecular equivalent amounts of the metal compounds shown below for the ferric sulfate non-ahydrate in Example 6, the corresponding metal tetrachlorocrotonate is obtained.

| Metal compound: | Metal tetrachlorocrotonate |
|---|---|
| Scandium sulfate | Scandium tetrachlorocrotonate. |
| Titanium chloride | Titanium tetrachlorocrotonate. |
| Vanadyl sulfate | Vanadyl tetrachlorcrotonate. |
| Polonium chloride | Polonium tetrachlorocrotonate. |
| Lead acetate | Lead tetrachlorocrotonate. |
| Tin chloride | Tin tetrachlorocrotonate. |
| Antimony chloride | Antimony tetrachlorocrotonate. |

As indicated above, the compounds of this invention are useful for the extraction of metal ions. This utility may be applied in analytical procedures or in industrial scale separations such as for the rare earth metals. Table I is presented below to demonstrate the manner in which the atomic number and valency of the metal ion affects the water solubility, ether solubility, and partition coefficient of the indicated tetrachlorocrotonic acid compound.

TABLE I

| Tetrachlorocrotonate | Solubility per 100 parts | | Partition coefficient ether/water |
|---|---|---|---|
| | $H_2O$ | Ether | |
| Sodium* | 150 | 5 | 0.003 |
| Calcium** | 70 | 95 | 1.5 |
| Copper** | <1 | 120 | 20 |
| Aluminum*** | <1 | 65 | 43 |

As indicated above, the compounds of this invention are useful as plant bactericides. Therefore, one embodiment of the invention is the application of a compound of Formula 1 to plants to protect said plants from bacteria such as *Pseudomonas lacrymans* which incites cucumber angular leaf spot, *Xanthomonas malvacearum* which incites cotton angular leaf spot, *Erwinia amylovora* which incites pome fruit fire blight, and the like. In one embodiment of this invention a formulation consisting of the following is prepared:

| | Percent |
|---|---|
| Calcium tetrachlorocrotonate | 20 |
| Tetrahydrofuran | 7 |
| A blend of polyethylene ethers and oil soluble sulfonates | 8 |
| Xylene | 65 |
| | 100 |

The above ingredients are stirred together until a homogeneous solution results. The solution is then suspended in water at concentrations of 80 and 16 parts per million active material. The suspensions are sprayed to the point of run off onto all leaf surfaces of young, potted, cucumber plants. After drying on a greenhouse bench, the cucumbers are placed in a lighted humidity chamber for 16 hours where they are pre-conditioned for inoculation. The under sides of the leaves are inoculated by spraying with a suspension of *Pseudomonas lacrymans*. The cucumber plants are returned to the humidity chamber where they remain for a four-day incubation period. The treated cucumbers remain healthy and are virtually free from the characteristic angular lesions of the disease. In contrast, the inoculated leaves of the untreated controls are practically covered by oozing, coalescing lesions, which upon drying leave holes in the foliage.

Compounds of this invention are also useful as herbicides to selectively control annual grasses and a number of broad-leaf weeds. In one embodiment of this invention a formulation consisting of the following is prepared:

| | Percent |
|---|---|
| Iron tris(tetrachlorocrotonate) | 60 |
| Dialkyl ester of sodium sulfosuccinic acid | 2 |
| Sodium ligninsulfonate | 3 |
| Attapulgite | 35 |
| | 100 |

The above ingredients are blended and then ground in a hammer mill to give a water dispersible powder. The resulting formulation is suspended at the rate of 6 kilograms per 200 liters of water. This volume is then sprayed uniformly over one hectare of established, clipped bluegrass turf. Application is timed to coincide with the one-inch stage of crabgrass (Rigitaria spp.). Emerged crabgrass, chickweed (*Stellaria media*) and henbit (*Lamium amplexicaule*) are controlled. Residual pre-emergence crabgrass control is also obtained with little effect on bluegrass.

Certain of the compounds of this invention are also useful as flame retardants. They may be incorporated, for example, into synthetic or natural polymers such as fibers, fabrics and plastics with a resulting decrease in the combustability of said materials. The tin, antimony, and zinc tetrachlorocrotonates are especially useful for this purpose.

What is claimed is:

1. A compound selected from the group consisting of calcium tetrachlorocrotonate, cupric tetrachlorocrotonate, manganous tetrachlorocrotonate, zinc tetrachlorocrotonate, ferric tetrachlorocrotonate, aluminum tetrachlorocrotonate, chromium tetrachlorocrotonate and nickelous tetrachlorocrotonate.

2. The compound of claim 1 which is calcium tetrachlorocrotonate.

3. The compound of claim 1 which is cupric tetrachlorocrotonate.

4. The compound of claim 1 which is manganous tetrachlorocrotonate.

5. The compound of claim 1 which is zinc tetrachlorocrotonate.

6. The compound of claim 1 which is ferric tetrachlorocrotonate.

7. The compound of claim 1 which is aluminum tetrachlorocrotonate.

8. The compound of claim 1 which is chromium tetrachlorocrotonate.

9. The compound of claim 1 which is nickelous tetrachlorocrotonate.

10. The process for preparing a metal tetrachlorocrotonate compound comprising the steps of:
   (a) contacting a compound selected from lithium tetrachlorocrotonate, sodium tetrachlorocrotonate and potassium tetrachlorocrotonate with a compound of the formula $NX_n$ where $n$ is a whole number selected from the group consisting of 2 and 3; N is the cation of a metal selected from calcium, copper, manganese, zinc, iron, aluminum, chromium or nickel, and X is an anion of a weak or strong acid; in the presence of water; and (b) isolating the product compound of the formula

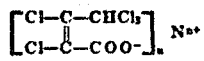

where $n$ and N are as above defined by the steps of (c) extracting said product compound from the reaction mixture into a water immiscible organic solvent selected from diethyl ether and chloroform;

(d) separating said water immiscible organic solvent containing the product compound from said reaction mixture; and (e) isolating said product compound from said water immisible organic solvent.

11. The process for preparing a metal tetrachlorocrotonate comprising the steps of:

(a) contacting tetrachlorocrotonic acid with a compound of the formula $MR_n$ where M is the cation of a metal selected from calcium, copper, manganese, zinc, chromium, nickel, iron or aluminum; $n$ is a whole number selected from the group consisting of 2 and 3; and R is oxygen, hydroxide, alkoxide, or an anion of a weak acid with a pKa of 1.9 or greater in the presence of water; and (b) isolating the product compound of the formula

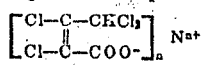

where $n$ and M are as above defined by the steps of (c) evaporating said water to leave a residue containing said reaction product;

(d) contacting said residue with an organic solvent to dissolve said reaction product; and (e) isolating said reaction product from said organic solvent.

References Cited

UNITED STATES PATENTS

| | | | |
|---|---|---|---|
| 2,596,371 | 5/1952 | Chadwick | 260—439 R |
| 2,874,176 | 2/1959 | Mills et al. | 260—439 R |
| 3,335,159 | 8/1967 | Remes et al. | 260—446 |

FOREIGN PATENTS

| | | |
|---|---|---|
| 1,024,952 | 2/1958 | Germany. |

OTHER REFERENCES

Maahs: Liebig's Annalen der Chemie 686 (1965), pp. 55–63.

DANIEL E. WYMAN, Primary Examiner

A. P. DEMERS, Assistant Examiner

U.S. Cl. X.R.

71—97; 252—8.1; 260—429.1, 429.2, 429.3, 429.5, 429.7, 429.9, 430, 431, 435 R, 438.1, 438.5 R, 439 R, 440, 446, 447, 448 R, 539 R; 424—257, 317

PO-1050
(5/69)

UNITED STATES PATENT OFFICE
CERTIFICATE OF CORRECTION

Patent No. __3,803,129__       Dated __April 9, 1974__

Inventor(s) __Frank R. Haglid__

It is certified that error appears in the above-identified patent and that said Letters Patent are hereby corrected as shown below:

In Column 7, Claim 11, the formula should appear as follows:

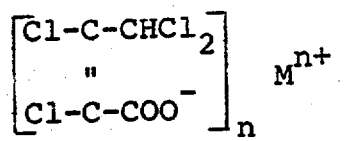

$$\left[ \begin{array}{c} Cl-C-CHCl_2 \\ \| \\ Cl-C-COO^- \end{array} \right]_n M^{n+}$$

Signed and sealed this 10th day of September 1974.

(SEAL)
Attest:

McCOY M. GIBSON, JR.             C. MARSHALL DANN
Attesting Officer                Commissioner of Patents